(12) United States Patent
Takeno et al.

(10) Patent No.: US 11,256,191 B2
(45) Date of Patent: Feb. 22, 2022

(54) DEVELOPER CARRYING MEMBER, PROCESS CARTRIDGE, AND ELECTROPHOTOGRAPHIC IMAGE FORMING APPARATUS

(71) Applicant: CANON KABUSHIKI KAISHA, Tokyo (JP)

(72) Inventors: Kineo Takeno, Shizuoka (JP); Kazuhito Wakabayashi, Shizuoka (JP); Atsushi Noguchi, Shizuoka (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 17/412,539

(22) Filed: Aug. 26, 2021

(65) Prior Publication Data

US 2021/0389691 A1    Dec. 16, 2021

Related U.S. Application Data

(63) Continuation of application No. PCT/JP2020/009017, filed on Mar. 4, 2020.

(30) Foreign Application Priority Data

Mar. 8, 2019  (JP) .............................. JP2019-042260
Feb. 7, 2020  (JP) .............................. JP2020-019611

(51) Int. Cl.
*G03G 15/08*  (2006.01)
*G03G 15/09*  (2006.01)

(52) U.S. Cl.
CPC ..... *G03G 15/0818* (2013.01); *G03G 15/0928* (2013.01)

(58) Field of Classification Search
CPC .................................................. G03G 15/0818
USPC .......................................................... 399/286
See application file for complete search history.

(56) References Cited

U.S. PATENT DOCUMENTS

| 6,154,625 | A  | 11/2000 | Saiki |
| 6,925,269 | B2 | 8/2005  | Hibino |
| 8,059,997 | B2 | 11/2011 | Otake et al. |
| 8,372,570 | B2 | 2/2013  | Matsuda et al. |
| 8,377,549 | B2 | 2/2013  | Takayama et al. |
| 8,546,051 | B2 | 10/2013 | Otake et al. |
| 8,628,846 | B2 | 1/2014  | Wakabayashi et al. |
| 8,792,810 | B2 | 7/2014  | Ito et al. |

(Continued)

FOREIGN PATENT DOCUMENTS

| JP | 57-5047 A   | 1/1982 |
| JP | 2-105181 A  | 4/1990 |

(Continued)

*Primary Examiner* — William J Royer
(74) *Attorney, Agent, or Firm* — Venable LLP (57) ABSTRACT

Provided is a developer carrying member that can stably form a high-quality electrophotographic image. The developer carrying member includes an electroconductive support and a surface layer in the stated order, wherein the surface layer contains a binder resin and electroconductive particles, and a content of the electroconductive particles in a region from a surface of the surface layer opposite to an outer surface thereof on a side facing the electroconductive support to a depth of 150 nm is 1% or more and 25% or less, and wherein the surface layer has a volume resistivity of $1.0 \times 10^{-2}$ Ω·cm or more and $1.0 \times 10^2$ Ω·cm or less.

9 Claims, 3 Drawing Sheets

(56) References Cited

U.S. PATENT DOCUMENTS

| | | |
|---|---|---|
| 8,837,985 B2 | 9/2014 | Ishida et al. |
| 8,846,287 B2 | 9/2014 | Yamada et al. |
| 9,026,012 B2 | 5/2015 | Otake et al. |
| 9,164,416 B2 | 10/2015 | Nakamura |
| 9,921,513 B2 | 3/2018 | Masu et al. |
| 9,989,879 B2 | 6/2018 | Doi et al. |
| 10,031,438 B2 | 7/2018 | Wakabayashi et al. |
| 10,036,971 B2 | 7/2018 | Doi et al. |
| 10,078,286 B2 | 9/2018 | Takeno et al. |
| 10,365,576 B2 | 7/2019 | Doi et al. |
| 10,459,356 B2 | 10/2019 | Takeno et al. |
| 10,712,684 B2 | 7/2020 | Wakabayashi et al. |
| 10,935,903 B2 * | 3/2021 | Sugiyama et al. ............ G03G 15/0818 |

FOREIGN PATENT DOCUMENTS

| | | |
|---|---|---|
| JP | 6-289724 A | 10/1994 |
| JP | 8-106212 A | 4/1996 |
| JP | 8-160739 A | 6/1996 |
| JP | 11-249414 A | 9/1999 |
| JP | 2003-114573 A | 4/2003 |
| JP | 2010-156923 A | 7/2010 |
| JP | 2012-8237 A | 1/2012 |
| JP | 2013-54105 A | 3/2013 |

* cited by examiner

DEVELOPER CARRYING MEMBER, PROCESS CARTRIDGE, AND ELECTROPHOTOGRAPHIC IMAGE FORMING APPARATUS

CROSS-REFERENCE TO RELATED APPLICATIONS

This application is a Continuation of International Patent Application No. PCT/JP2020/009017, filed Mar. 4, 2020, which claims the benefit of Japanese Patent Application No. 2019-042260, filed Mar. 8, 2019 and Japanese Patent Application No. 2020-019611 filed Feb. 7, 2020, all of which are hereby incorporated by reference herein in their entirety.

BACKGROUND

The present disclosure is directed to a developer carrying member to be used in an electrophotographic apparatus, and a process cartridge and an electrophotographic image forming apparatus each including the developer carrying member.

DESCRIPTION OF THE RELATED ART

In an electrophotographic image forming apparatus, an electrophotographic photosensitive member (hereinafter sometimes referred to as "photosensitive member") is charged by a charging roller and exposed, and as a result, an electrostatic latent image is formed on the photosensitive member. Next, toner in a developer container is applied onto a developer carrying member by a toner-supplying roller and a toner-regulating member. Next, the toner is conveyed by the developer carrying member to a developing region. The electrostatic latent image on the photosensitive member is developed with the toner conveyed to the developing region in an abutting portion between the photosensitive member and the developer carrying member, or a portion close thereto. After that, the toner on the photosensitive member is transferred onto recording paper by transferring means, and is fixed by heat and a pressure, while the toner remaining on the photosensitive member is removed from the top of the photosensitive member by cleaning means.

Incidentally, as the formation of an electrophotographic image is repeated, a so-called charge-up phenomenon in which the charge quantity of the toner carried on the outer surface of the developer carrying member becomes excessively high owing to its contact with the developer carrying member may occur. When the charge-up phenomenon occurs, the toner sticks onto the outer surface of the developer carrying member, and toner to be newly supplied thereonto is hardly charged, and hence the charged state of the toner becomes nonuniform to reduce image quality in some cases.

In Japanese Patent Application Laid-Open No. H02-105181, there is a disclosure of a developer carrying member having formed on its surface a film containing crystalline graphite, the crystalline graphite being exposed to the surface of the film.

SUMMARY

At least one aspect of the present disclosure is directed to providing a developer carrying member that can stably provide a high-quality image. Another aspect of the present disclosure is directed to providing a process cartridge conducive to the formation of a high-quality electrophotographic image. Another aspect of the present disclosure is directed to providing an electrophotographic image forming apparatus that can stably form a high-quality electrophotographic image.

According to one aspect of the present disclosure, there is provided a developer carrying member including an electroconductive support and a surface layer in the stated order, the surface layer contains a binder resin and electroconductive particles, and a content of the electroconductive particles in a region from a surface of the surface layer opposite to an outer surface thereof on a side facing the electroconductive support to a depth of 150 nm is 1% or more and 25% or less, and wherein the surface layer has a volume resistivity of $1.0 \times 10^{-2}$ Ω·cm or more and $1.0 \times 10^{2}$ Ω·cm or less.

According to another aspect of the present invention, there is provided a process cartridge removably mounted onto a main body of an electrophotographic apparatus, the process cartridge including at least: a toner container containing toner; and a developer carrying member configured to convey the toner, wherein the developer carrying member is the above-mentioned developer carrying member.

According to another aspect of the present invention, there is provided an electrophotographic apparatus including at least: an electrophotographic photosensitive member; a charging member arranged so as to be capable of charging the electrophotographic photosensitive member; and a developer carrying member configured to supply toner to the electrophotographic photosensitive member, wherein the developer carrying member is the above-mentioned developer carrying member.

Further features of the present invention will become apparent from the following description of exemplary embodiments with reference to the attached drawings.

DESCRIPTION OF THE EMBODIMENTS

An investigation by the inventors has found that in the case of a developer carrying member according to Japanese Patent Application Laid-Open No. H02-105181, the developer carrying member having formed on its surface a film containing a crystalline graphite so that the graphite may be exposed to its surface, toner is liable to stick to the toner-carrying surface (hereinafter sometimes referred to as "outer surface") of the developer carrying member.

This is probably because of the fact that the film containing the crystalline graphite so that the graphite may be exposed to its surface forms the outer surface of the developer carrying member, and hence a reflection force acting between the toner and the film becomes larger.

An example of a force acting between the toner and the surface of the developer carrying member is the reflection force. The reflection force may be represented by the equation (A). That is, the reflection force is an electric force acting on the toner, which is positioned at a distance of "a" from the surface of the developer carrying member and has a charge of −q, in the case where it is assumed that a fictitious charge "q", which is positioned in the surface of the developer carrying member at a distance of "a" from the surface and has a charge of +q, is present. A larger reflection force means a larger adhesive force of the toner to the surface of the developer carrying member, and as the distance "a" becomes smaller, the reflection force acting on the toner becomes larger. The reflection force may be a cause for the charge-up described above.

$$F = \frac{q^2}{4\pi \cdot \varepsilon_0 \cdot (2a)^2} \frac{1-\varepsilon_r}{1+\varepsilon_r} \quad \text{Equation (A)}$$

F: The reflection force between the toner and the developer carrying member

"q": The charge

"a": The distance between the charge and the surface of the developer carrying member $\varepsilon_0$: A dielectric constant of vacuum $\varepsilon_r$: The relative dielectric constant of the developer carrying member As is apparent from the equation (A), as the absolute value of the charge "q" becomes larger, and as the distance "a" between the charge and the surface of the developer carrying member becomes smaller, the reflection force F becomes larger. In addition, as the relative dielectric constant $\varepsilon_r$ of the developer carrying member becomes smaller, the reflection force F becomes smaller. Accordingly, the reflection force can be reduced by reducing the dielectric constant of the vicinity of the outer surface of the developer carrying member having a large influence on the reflection force. In general, the relative dielectric constant of an electroconductive particle is larger than that of a resin. Accordingly, a reduction in content of the electroconductive particles present near the outer surface of the developer carrying member may be effective in reducing the reflection force.

Meanwhile, when the toner is excessively charged, the developer carrying member has a function of optimizing the charge of the toner by receiving the charge. The incorporation of a certain amount of the electroconductive particles into the vicinity of the outer surface of the developer carrying member in contact with the toner is effective in more sufficiently expressing the function.

As described above, a configuration required for the developer carrying member to reduce the reflection force and a configuration required for the developer carrying member to suppress the charge-up of the toner are contrary to each other.

In view of the foregoing, the inventors have made investigations with a view to obtaining a developer carrying member that can achieve both of a reduction in reflection force and the suppression of the charge-up of the toner at high levels. As a result, the inventors have found that a developer carrying member having the following configuration is conducive to the achievement of the object:

a developer carrying member including an electroconductive support and a surface layer in the stated order, in which the surface layer contains a binder resin and electroconductive particles, and the content of the electroconductive particles in a region from the surface of the surface layer opposite to the outer surface thereof on a side facing the electroconductive support to a depth of 150 nm is 1% or more and 25% or less, and in which the surface layer has a volume resistivity of $1.0 \times 10^{-2}$ Ω·cm or more and $1.0 \times 10^2$ Ω·cm or less.

That is, an investigation by the inventors has found that the content of the electroconductive particles in the region from the outer surface of the developer carrying member to a depth of 150 nm mainly dominates the reflection force between the developer carrying member and the toner present on the outer surface. In addition, the inventors have found that the setting of the content of the electroconductive particles in the region to 1% or more and 25% or less can reduce the reflection force, and hence can suppress the sticking of the toner.

In addition, the inventors have found that when the volume resistivity of the surface layer for forming the outer surface of the developer carrying member is set to $1.0 \times 10^{-2}$ Ω·cm or more and $1.0 \times 10^2$ Ω·cm or less on condition that the above-mentioned requirement is satisfied, the charge-up of the toner can also be suppressed.

Figure 1A:
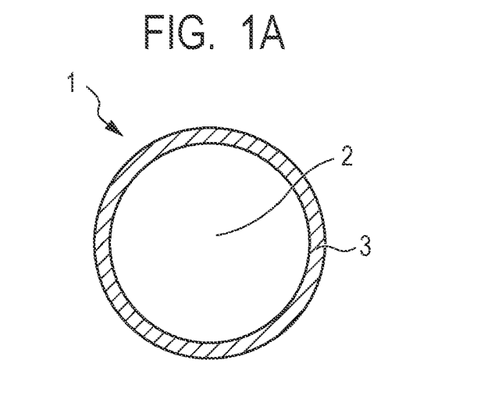
FIG. 1A is a conceptual view for illustrating an example of a developer carrying member of the present disclosure.
Figure 1B:
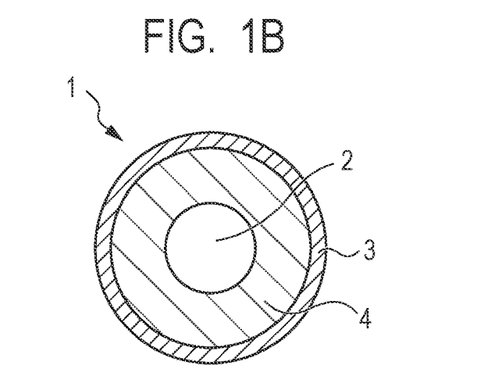
FIG. 1B is a conceptual view for illustrating an example of the developer carrying member of the present disclosure.
Figure 1C:
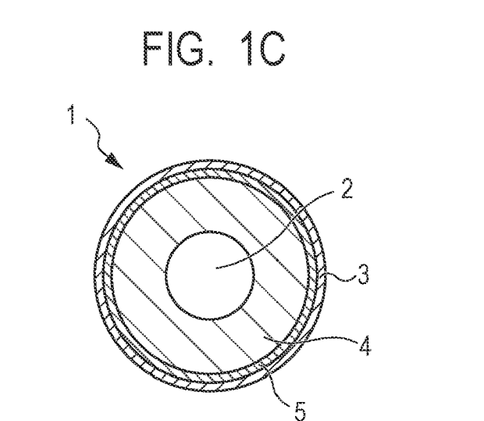
FIG. 1C is a conceptual view for illustrating an example of the developer carrying member of the present disclosure.

Sectional views of a roller-shaped developer carrying member according to one aspect of the present disclosure in a direction perpendicular to its shaft direction are illustrated in FIG. 1A to FIG. 1C. As illustrated in FIG. 1A, a developing roller 1 has a surface layer 3 formed on the outer peripheral surface of a columnar or hollow cylindrical electroconductive support 2.

As another configuration of the developer carrying member 1, as illustrated in FIG. 1B, the developer carrying member 1 includes the columnar or hollow cylindrical electroconductive support 2 and the surface layer 3, and further includes an elastic layer 4 serving as an option between the electroconductive support 2 and the surface layer 3. That is, the developer carrying member 1 includes the electroconductive support 2, the elastic layer 4 serving as an option on the electroconductive support 2, and the surface layer on the elastic layer 4. Further, the developer carrying member 1 may be a three-layer structure in which an intermediate layer 5 is arranged between the surface layer 3 and the elastic layer 4 as illustrated in FIG. 1C, or a multilayer structure in which a plurality of intermediate layers 5 are arranged therebetween. A known intermediate layer for a developer carrying member may be used as the intermediate layer.

Electroconductive Support

The electroconductive support functions as an electrode and support member of the developer carrying member, and includes, for example, any one of the following conductive materials: a metal or an alloy, such as aluminum, a copper alloy, or stainless steel; iron subjected to plating treatment with chromium or nickel; and a synthetic resin having conductivity. The electroconductive support may be solid or hollow. In addition, the electroconductive support may be subjected to surface treatment or surface application, such as alumite treatment or primer application, for improving adhesiveness between the electroconductive support and the surface layer.

Elastic Layer

When the developer carrying member and any other member, such as a photosensitive member or a developer-regulating blade, are brought into abutment with each other, the elastic layer serving as an option imparts elasticity to the developer carrying member for facilitating the formation of a nip having a predetermined width.

A material known as a material for an elastic layer or a material that may be utilized for an elastic layer may be used as a material for forming the elastic layer 4. In normal cases, the elastic layer is preferably formed of a molded body of a rubber material. Examples of the rubber material include the following materials.

An ethylene-propylene-diene copolymer rubber (EPDM), an acrylonitrile-butadiene rubber (NBR), a chloroprene rubber (CR), a natural rubber (NR), an isoprene rubber (IR), a styrene-butadiene rubber (SBR), a fluorine rubber, a silicone rubber, an epichlorohydrin rubber, a hydrogenated NBR, and a urethane rubber.

Those materials may be used alone or as a mixture thereof.

Various additives, such as a conductivity-imparting agent, a non-electroconductive filler, a crosslinking agent, and a catalyst, are appropriately blended into the elastic layer 4. Fine particles of carbon black, of a conductive metal, such as aluminum or copper, or of a conductive metal oxide, such as zinc oxide, tin oxide, or titanium oxide, may be used as the conductivity-imparting agent. At least one kind of those agents may be used. Of those, the carbon black is particularly preferred because the carbon black is relatively easily available and provides satisfactory conductivity. When the carbon black is used as the conductivity-imparting agent, the carbon black is preferably blended in an amount of 2 parts by mass or more and 50 parts by mass or less with respect to 100 parts by mass of the rubber material in the material for forming the elastic layer 4.

Examples of the non-electroconductive filler include silica, quartz powder, titanium oxide, zinc oxide, and calcium carbonate. At least one kind of those fillers may be used. Examples of the crosslinking agent include di-t-butyl peroxide, 2,5-dimethyl-2,5-di(t-butylperoxy)hexane, and dicumyl peroxide. At least one kind of those agents may be used.

Surface Layer

The content of the electroconductive particles in the region from the surface (hereinafter sometimes referred to as "first surface") of the surface layer opposite to the surface (hereinafter sometimes referred to as "second surface") thereof on the side facing the electroconductive support to a depth of 150 nm is 1% or more and 25% or less. The first surface is a surface, which forms the outer surface of the developer carrying member, and which is brought into contact with toner and has formed thereon the layer of the toner in an electrophotographic image-forming step. The region from the first surface of the surface layer to a depth of 150 nm is hereinafter sometimes simply referred to as "first region."

When the content of the electroconductive particles in the first region of the surface layer is 1% or more and 25% or less, charge-imparting performance to the toner can be maintained, and the adhesion of the toner to the first surface can be significantly suppressed.

In addition, when the content of the electroconductive particles in the first region is represented by A1 (%), and the content of the electroconductive particles in a region (hereinafter sometimes referred to as "second region") from a depth of 150 nm from the first surface of the surface layer to a depth of 300 nm therefrom is represented by A2 (%), the surface layer preferably satisfies a relationship of A1<A2.

When the toner is carried on the first surface, a distance between each of the electroconductive particles in the second region and the toner on the first surface is large, and hence their contribution to the reflection force F is small.

Meanwhile, the surface layer needs to have predetermined conductivity so that a charge can be flowed from the first surface toward the second surface for suppressing excessive charging of the toner. When the A2 is set to be larger than the A1, the volume resistivity of the surface layer can be reduced while the reflection force F is suppressed from increasing.

Calculation of Content of Electroconductive Particles

A method of calculating the contents of the electroconductive particles in the first region and the second region is described below.

(i) The surface layer of the developer carrying member is cut with a razor in a direction perpendicular to the electroconductive support, and sectional samples of thin slices each having a thickness of 1.5 μm are produced from the layer with a microtome in an environment at a temperature of −120° C. established by using liquid nitrogen. The sectional samples are collected from a total of six sites formed of: three sites for dividing the surface layer in four equal parts in the longitudinal direction of the developer carrying member; and three sites obtained by rotating the sites by 180° each.

(ii) A secondary electron image is obtained for each of the sectional samples with a scanning electron microscope (e.g., a microscope available under the product name "Ultra-Plus" from Carl Zeiss AG) under the following conditions.
Observation conditions: a magnification of 20,000, an acceleration voltage of 1.0 kV (section), and a work D of 3.5 mm (iii) The resultant secondary electron image is binarized with image processing software (e.g., "Image J," open source) by Otsu's method, and the area ratio of carbon black serving as the electroconductive particles in each of a rectangular region of the sectional sample measuring 150 nm in a depth direction from the first surface of the surface layer by 5,000 nm in a lateral direction, and a rectangular region thereof ranging from a depth of 150 nm from the first surface of the surface layer to a depth of 300 nm therefrom, and measuring 5,000 nm in the lateral direction is calculated with image processing software (product name: Luzex-AP, manufactured by Nireco Corporation).

The carbon black area ratios in the respective regions are calculated for each of the six sectional samples as described above, and the averages of the calculated values are adopted as the contents A1% and A2% of the electroconductive particles in the first region and the second region, respectively.

In addition, the volume resistivity of the developer carrying member is $1.0 \times 10^{-2}$ Ω·cm or more and $1.0 \times 10^{2}$ Ω·cm or less. With such configuration, the charge-up of the toner to be carried on the first surface can be effectively suppressed. A method of measuring the volume resistivity of the developer carrying member is described below.

Method of Measuring Volume Resistivity

Three conductive tapes each having a width of 12 mm are wound around the surface of the developer carrying member at intervals of 8 mm, and a conductive tape D2 positioned at the center out of the three conductive tapes, and the mandrel of the developer carrying member are used as main electrodes in the measurement, while two conductive tapes D1 and D3 outside the tape D2 are used as guard electrodes therein. After the developer carrying member has been left to stand in an evaluation environment (having a temperature of 23° C. and a relative humidity of 50%) for 12 hours, the measurement is performed under the environment. The measurement is performed with an AC impedance analyzer (an impedance analyzer Model 1260 and a dielectric constant-measuring interface Model 1296 manufactured by Solartron Analytical). An AC voltage of 100 mV is superimposed on a DC voltage of 0 V, and the complex impedance characteristics of the developer carrying member are measured for a frequency change from 1 MHz to 1 Hz.

A resistance component is calculated by analyzing the results of the measurement with impedance analysis software ZView. The volume resistivity is calculated from the component and the shape of the sample that has been separately determined.

Although a method of forming the surface layer is not particularly limited, examples thereof include spraying with, immersion in, and roll coating with a paint. Such a dip coating method as described in Japanese Patent Application Laid-Open No. S57-5047 including causing the paint to overflow from the upper end of an immersion tank is simple and excellent in production stability as a method of forming the surface layer.

At the time of the production of the surface layer according to this aspect, a raw material having a solubility parameter (SP) value of 9.0 or more is preferably selected as a raw material for the binder resin in the surface layer. The inventors have assumed a reason for the foregoing to be as described below.

When a paint for forming the surface layer containing the raw material for the binder resin and the electroconductive particles is applied to the outer surface of the electroconductive support to form a coating film of the paint, in the case where the paint contains the raw material for the binder resin having a SP value of 9.0 or more, the wettability of the paint to the electroconductive support is low, and hence a force for keeping the raw material for the binder resin away from the electroconductive support acts in the coating film. In that case, the raw material for the binder resin in the coating film is easily biased toward the surface of the coating film on a side distant from the electroconductive support. As a result, in the coating film, the ratio of the electroconductive particles on the side distant from the electroconductive support becomes relatively lower than that on a side close to the electroconductive support. In addition, the curing of the coating film in such state may form the surface layer according to this aspect.

Accordingly, the wettability of the raw material for the binder resin having a SP value of 9.0 or more to the application target surface to which the paint is applied only needs to be poor. Accordingly, as long as the condition is satisfied, the application target surface does not need to be the outer surface of the electroconductive support, and may be, for example, the outer surface (surface opposite to the electroconductive support) of the elastic layer formed on the electroconductive support.

For example, a case in which the surface layer contains a urethane resin as the binder resin is described. In this case, the developer carrying member according to this aspect may be obtained by: directly applying, as the paint for forming the surface layer, a paint containing a polyisocyanate and a polyol, and having a SP value of 9.0 or more onto an electroconductive support whose outer surface contains at least one selected from aluminum and alumina to form a coating film of the paint; and then curing the coating film. In the developer carrying member thus formed, the surface layer is directly provided on the surface of the electroconductive support, and the surface layer contains a cured product of the paint for forming the surface layer containing the polyisocyanate, the polyol, and the electroconductive particles.

Method of Measuring SP Value

A method of measuring the SP value of the raw material for the binder resin is described by taking a case in which the binder resin is the urethane resin as an example. A raw material for the urethane resin is a mixture of the polyisocyanate and the polyol. Accordingly, a mixture containing the polyisocyanate and the polyol at the same quantity ratio as a quantity ratio between the polyisocyanate and the polyol in the paint for forming the surface layer is prepared. 0.5 Gram of the mixture is loaded into a 100-milliliter beaker, and 10 ml of the following good solvent is added with a volumetric pipette to dissolve the mixture, thereby preparing a titration mixture.

Next, the following poor solvent is dropped into the titration mixture with a 50-milliliter burette, and the volume fraction ($\varphi pl$) of the poor solvent at the time point when turbidity occurs is recorded. In addition, deionized water is dropped into the titration mixture, and the volume fraction ($\varphi ph$) of the deionized water at the time point when turbidity occurs is recorded. The measurement is performed at a liquid temperature of 20° C.

Good solvent: methyl ethyl ketone (SP value obtained by Hansen measurement: $\delta g=9.77$)
Poor solvent: hexane (SP value: $\delta pl=7.24$), deionized water (SP value: $\delta ph=23.50$)

The SP values ($\delta ml$ and $\delta mh$) of the mixed forms at the turbidity points each produced by dropping the poor solvent or the deionized water may be represented as the volume averages of the SP values of the poor solvent and the good solvent as represented by the following equation 1 and equation 2, respectively. In addition, the SP value $\delta poly$ of the mixture is a value intermediate between the $\delta ml$ and the $\delta mh$, and hence may be determined by the equation 3.

$$\delta ml = \varphi pl \cdot \delta pl + (1-\varphi pl)\delta g \quad (1)$$

$$\delta mh = \varphi ph \cdot \delta ph + (1-\varphi ph)\delta g \quad (2)$$

$$\delta poly = (\delta ml + \delta mh)/2 \quad (3)$$

Binder Resin

Although the binder resin is not particularly limited, specific examples thereof may include a polyurethane resin, an acrylic resin, a urea resin, a melamine resin, an alkyd resin, a phenol resin, a polyamide resin, an epoxy resin, and a polyester resin.

Of those, the polyurethane resin or the polyamide resin is preferred from the viewpoint of the ease with which a resin having the above-mentioned SP value is synthesized. Further, a urethane resin may be particularly suitably used because the resin has a low dielectric constant and easily provides satisfactory abrasion resistance.

The urethane resin is obtained by causing a polyisocyanate and a polyol to react with each other. In addition, high-polarity materials are preferably selected so that a SP value of 9.0 or more may be obtained.

Polyisocyanate

A polyisocyanate known as a polyisocyanate for synthesizing a urethane resin or a polyisocyanate that may be used for synthesizing a urethane resin may be used as the polyisocyanate. Examples of the polyisocyanate include isocyanate compounds including: aliphatic polyisocyanates, such as ethylene diisocyanate and 1,6-hexamethylene diisocyanate (HDI); alicyclic polyisocyanates, such as isophorone diisocyanate (IPDI), cyclohexane-1,3-diisocyanate, and cyclohexane-1,4-diisocyanate; aromatic isocyanates, such as 2,4-tolylene diisocyanate, 2,6-tolylene diisocyanate (TDI), 4,4'-diphenylmethane diisocyanate (MDI), polymeric diphenylmethane diisocyanate, xylylene diisocyanate, and naphthalene diisocyanate; and copolymerized products, isocyanurate bodies, TMP adducts, biuret bodies, and block bodies thereof. At least one kind of those materials may be used.

Polyol

A polyol (polycarbonate polyol/polyether polyol/polyester polyol) known as a polyol for synthesizing a urethane resin or a polyol that may be used for synthesizing a urethane resin may be used as the polyol. The polyol has a plurality of hydroxy groups in a molecule thereof, and the hydroxy groups react with the polyisocyanate.

At least one kind selected from a polycarbonate diol and a polycarbonate triol may be used as the polycarbonate polyol. Of those, the polycarbonate diol is preferred. An example of the polycarbonate diol may be such a polycarbonate diol that both terminals of a structure obtained by repeated bonding of alkylene chains each of which may have a moiety for forming part of a cyclic hydrocarbon structure through carbonate bonds are hydroxy groups.

Examples of the alkylene chain of the polycarbonate diol that may have a moiety for forming part of the cyclic hydrocarbon structure may include: a linear or branched alkylene group having 3 or more and 8 or less carbon atoms; and an alkylene group having 4 or more and 8 or less carbon atoms, the group including a cyclic hydrocarbon structure having 4 or more and 6 or less carbon atoms.

Examples of the polycarbonate diol include the following polycarbonate diols: polynonamethylene carbonate diol, poly(2-methyl-octamethylene)carbonate diol, polyhexamethylene carbonate diol, polypentamethylene carbonate diol, poly(3-methylpentamethylene)carbonate diol, polytetramethylene carbonate diol, polytrimethylene carbonate diol, poly(1,4-cyclohexanedimethylenecarbonate) diol, poly(2-ethyl-2-butyl-trimethylene)carbonate diol, and random or block copolymers thereof. At least one kind of those polycarbonate diols may be used.

Examples of a polyester-polycarbonate-copolymerized polyol include the following copolymers: a copolymer obtained by subjecting the above-mentioned polycarbonate polyol to polycondensation with a lactone, such as ε-caprolactone; and a copolymer of the polycarbonate polyol and a polyester obtained by subjecting an alkanediol and a dicarboxylic acid to polycondensation. Examples of the alkanediol for forming the polyester may include alkanediols each having 4 to 6 carbon atoms, such as 1,4-butanediol, 1,5-pentanediol, 1,6-hexanediol, 3-methylpentanediol, and neopentyl glycol. At least one kind of those alkanediols may be used.

In addition, examples of the dicarboxylic acid may include adipic acid, sebacic acid, suberic acid, glutaric acid, and pimelic acid. At least one kind of those acids may be used.

The polycarbonate polyol may be synthesized by a known method. The polycarbonate polyol may be obtained by, for example, a dehydrochlorination reaction between a low-molecular weight alcohol having 1 to 8 carbon atoms to be used in the synthesis of a polyester polyol and phosgene, or an ester exchange reaction between the low-molecular weight alcohol and dimethyl carbonate, diethyl carbonate, diphenyl carbonate, or the like.

In addition, the polyester-polycarbonate-copolymerized polyol may be obtained by a method including causing a carbonate compound for copolymerizing a polycarbonate to react with a polyester oligomer obtained by causing a diol and a dicarboxylic acid to react with each other.

An example of the diol to be used in the method may be a diol having an alkylene chain that may have a cyclic structure. Examples of the diol having an alkylene chain that may have a moiety for forming part of a cyclic structure may include 1,3-propanediol, 1,4-butanediol, 1,6-hexanediol, 1,4-bis(hydroxymethyl)cyclohexane, 1,4-bis(hydroxyethyl)cyclohexane, 3-methyl-1,5-pentanediol, 1,4-benzenedimethanol, and 1,8-octanediol. At least one kind of those diols may be used.

Examples of the dicarboxylic acid in the above-mentioned method may include adipic acid, sebacic acid, suberic acid, glutaric acid, and pimelic acid. At least one kind of those acids may be used.

A carbonic acid ester of a lower alcohol having 1 to 3 carbon atoms may be used as the carbonate compound in the above-mentioned method. Examples of the carbonic acid ester may include dimethyl carbonate and diethyl carbonate.

Examples of the polyether polyol include polyethylene glycol, polypropylene glycol, and polytetramethylene glycol.

In addition, an example of a polyester polyol free of any carbonate bond is a polyester polyol obtained by a condensation reaction between a diol component, such as 1,4-butanediol, 3-methyl-1,4-pentanediol, or neopentyl glycol, or a triol component, such as trimethylolpropane, and a dicarboxylic acid, such as adipic acid, phthalic anhydride, terephthalic acid, or hexahydroxyphthalic acid. The polyether polyol and the polyester polyol may each be provided as a prepolymer whose chain has been extended with an isocyanate, such as 2,4-tolylene diisocyanate (TDI), 1,4-diphenylmethane diisocyanate (MDI), or isophorone diisocyanate (IPDI), in advance as required.

The ratio (L/M) of the number (L) of isocyanate groups to the number (M) of hydroxy groups in the urethane resin is preferably from 1.0 to 2.0. The ratio L/M is preferably 2.0 or less because as the ratio L/M becomes smaller, the SP value of the resin becomes larger. Meanwhile, when the ratio L/M is set to 1.0 or more, the amount of an unreacted component of the polyol component can be reduced, and hence the film formability of the paint is hardly impaired.

The thickness of the surface layer preferably falls within the range of from 5.0 μm or more to 50.0 μm or less. When the thickness is 5.0 μm or more, the surface layer can uniformly cover the entirety of the surface of the electroconductive support. Accordingly, the electroconductive support is prevented from being partially exposed, and hence a triboelectric charge can be uniformly imparted to the developer of the developer carrying member. In addition, when the thickness is 50.0 μm or less, it becomes easier to stably control the surface roughness of the layer.

A blending agent, a conductivity-imparting agent, a non-electroconductive filler, a crosslinking agent, or a catalyst may be added to the surface layer. Examples of the blending agent include a filler, a softening agent, a processing aid, a tackifier, an antitack agent, and a foaming agent to be generally used in resins. Examples of the non-electroconductive filler include silica, quartz powder, titanium oxide, and calcium carbonate. Although the crosslinking agent is not particularly limited, examples thereof include tetraethoxysilane, di-t-butyl peroxide, 2,5-dimethyl-2,5-di(t-butylperoxy)hexane, and dicumyl peroxide.

Electroconductive Particles

Carbon black, conductive metal particles, such as aluminum particles and copper, and conductive metal oxide particles, such as zinc oxide, tin oxide, and titanium oxide, may be used as the electroconductive particles. Those particles may be used alone or as a mixture thereof. Of those, the carbon black is preferred because satisfactory electron conductivity is obtained. In addition, when the urethane resin is used as the binder resin, acidic carbon black having a pH value of 7.0 or less out of various kinds of the carbon black may be particularly suitably used. This is because of the following reason. The acidic carbon black has satisfactory dispersibility in the paint for forming the surface layer containing the polyisocyanate and the polyol that are raw materials for the urethane resin. Accordingly, the migration of the raw materials for the binder resin from a side close to the application target surface to a side distant from the application target surface in the coating film at the time of the application of the paint to the application target surface is hardly inhibited, and hence the surface layer according to this aspect is easily formed.

When the carbon black is used as the electroconductivity-imparting agent, the carbon black is preferably blended in an amount of 1 part by mass or more and 50 parts by mass or less with respect to 100 parts by mass of the binder resin materials in the paint for forming the surface layer.

When the surface layer of the developer carrying member is required to have a surface roughness, fine particles for roughness control may be added to the surface layer. The volume-average particle diameter of the fine particles for roughness control is preferably from 3 µm to 20 µm because a developer carrying member having an excellent toner-conveying ability is obtained. In addition, the amount of the fine particles to be added to the surface layer is preferably from 1 part to 50 parts with respect to 100 parts by mass of the resin solid content of the surface layer because the effects of the present disclosure are not impaired. Fine particles of a polyurethane resin, a polyester resin, a polyether resin, a polyamide resin, an acrylic resin, or a phenol resin may be used as the fine particles for roughness control.

The developer carrying member according to this aspect may be applied to any one of, for example, a noncontact-type developing apparatus and a contact-type developing apparatus each using a magnetic one-component developer or a nonmagnetic one-component developer, and a developing apparatus using a two-component developer.

Process Cartridge and Electrophotographic Image Forming Apparatus

A process cartridge and an electrophotographic image forming apparatus according to one aspect of the present disclosure are described in detail with reference to the drawings.

Figure 2:
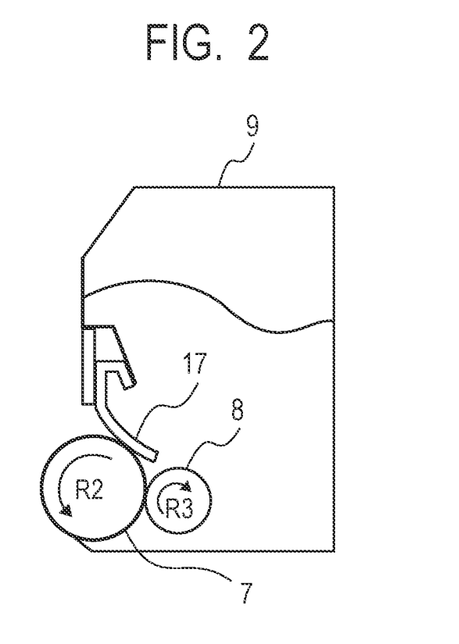
FIG. 2 is a schematic configuration view for illustrating an example of a process cartridge of the present disclosure.
Figure 3:
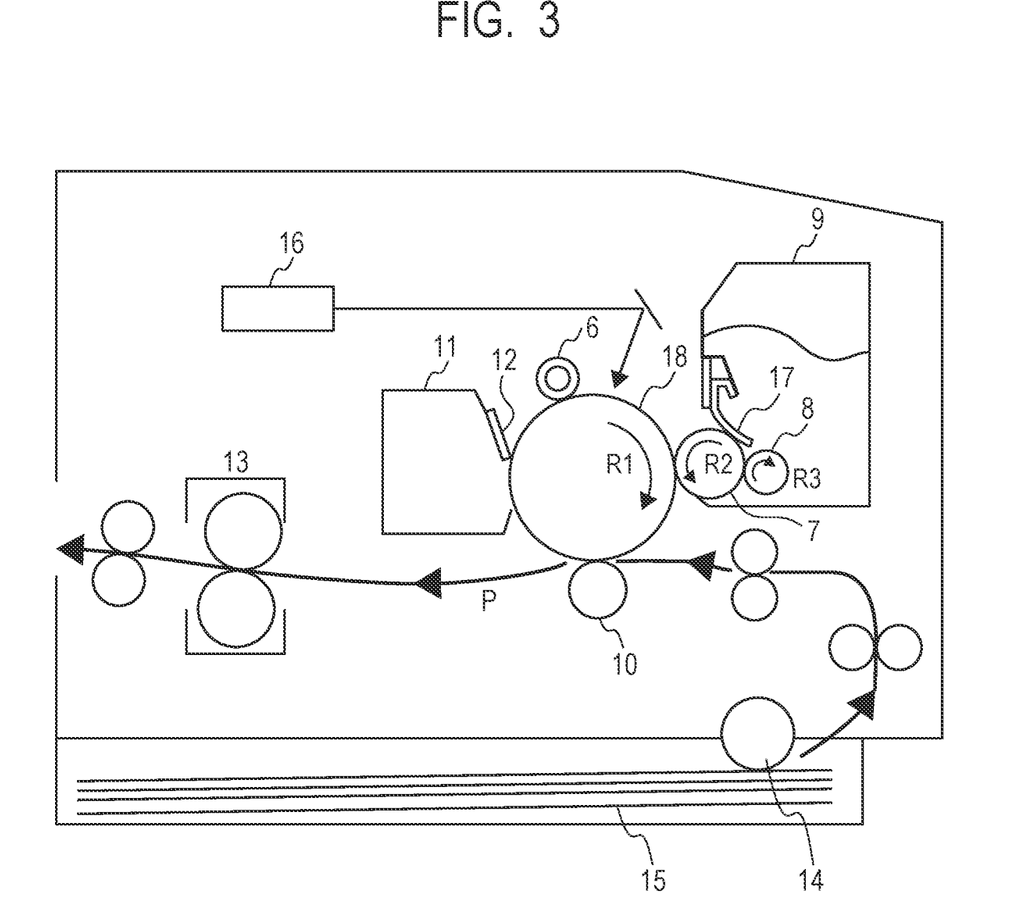
FIG. 3 is a schematic configuration view for illustrating an example of an electrophotographic apparatus of the present disclosure.

FIG. 2 is a schematic configuration view for illustrating an example of a process cartridge using the developer carrying member according to this aspect as a developing member. In addition, FIG. 3 is a schematic configuration view for illustrating an example of an electrophotographic image forming apparatus having incorporated therein the process cartridge in a removable manner.

The process cartridge illustrated in FIG. 2 includes a toner container 9, a developer carrying member 7, a developer-regulating member 17, and a developer-supplying member 8, and has such a configuration as to be removably mounted onto the main body of an electrophotographic image forming apparatus. In FIG. 3, an electrostatic latent image-bearing member 18, which is an image-bearing member having formed thereon an electrostatic latent image, is rotated in a direction indicated by an arrow R1. The developer carrying member 7 rotates in a direction indicated by an arrow R2 to convey its developer to a developing region where the developer carrying member 7 and the electrostatic latent image-bearing member 18 face each other. In addition, the developer-supplying member 8 is in contact with the developer carrying member, and rotates in a direction indicated by an arrow R3 to supply the developer to the surface of the developer carrying member 7.

A charging roller 6 serving as a charging member arranged so as to be capable of charging the electrostatic latent image-bearing member 18, a transfer member (transfer roller) 10, a cleaner container 11, a cleaning blade 12, a fixing unit 13, a pickup roller 14, and the like are arranged around the electrostatic latent image-bearing member 18. The electrostatic latent image-bearing member 18 is charged by the charging roller 6. Then, a laser generator 16 applies laser light to the electrostatic latent image-bearing member 18 to perform exposure, and hence the electrostatic latent image corresponding to a target image is formed thereon. The electrostatic latent image on the electrostatic latent image-bearing member 18 is developed with the developer in the toner container 9 of the process cartridge serving as a developing unit to provide an image. The development performed here is so-called reversal development in which the exposed portion is developed with the developer. A transfer material (paper) P is conveyed from a sheet-feeding portion 15 into the apparatus by the pickup roller 14 and the like, and the image is transferred onto the transfer material (paper) P by the transfer member (transfer roller) 10 brought into abutment with the electrostatic latent image-bearing member 18 through the transfer material (paper) P. The transfer material (paper) P having mounted thereon the image is conveyed to the fixing unit 13, and the developer is fixed onto the transfer material (paper) P. In addition, the developer remaining on the electrostatic latent image-bearing member 18 is scraped off by the cleaning blade 12, and is stored in the cleaner container 11.

The developer-regulating member 17 is preferably brought into abutment with the developer carrying member 7 through the developer to regulate the thickness of a developer layer on the developer carrying member 7. A regulating blade may be suitably used as the developer-regulating member 17 to be brought into abutment with the developer carrying member 7.

A rubber elastic body, such as a silicone rubber, a urethane rubber, or an NBR, a synthetic resin elastic body, such as polyethylene terephthalate, or a metal elastic body, such as a phosphor bronze plate or a SUS plate, may be used as a material for forming the above-mentioned regulating blade, and a composite thereof may also be used. Further, a structure obtained by bonding a charge-controlling material, such as a resin, a rubber, a metal oxide, or a metal, to an elastic support, such as a rubber, a synthetic resin, or a metal elastic body, may be used for the purpose of controlling the chargeability of the developer. In this case, the regulating blade is used so that its charge-controlling material portion may serve as a portion to be brought into abutment with the developer carrying member. Such regulating blade is particularly preferably a blade obtained by bonding the resin or the rubber to the metal elastic body. A product that can be easily charged to positive polarity, such as a urethane rubber, a urethane resin, a polyamide resin, or a nylon resin, is preferred as such resin or rubber.

EXAMPLES

Specific Examples and Comparative Examples are described below.

Production of Elastic Roller K-1

Preparation of Mixture for Producing NBR/Hydrin Elastic Layer

The following materials for forming an NBR/hydrin elastic layer were mixed with a 6-liter pressure kneader (product name: TD6-15MDX, manufactured by Toshin Co., Ltd.) at a filling ratio of 70 vol % and a blade revolution number of 30 rpm for 16 minutes to provide a mixture 1.

| | |
|---|---|
| Acrylonitrile-butadiene rubber (product name: N230SV, manufactured by JSR Corporation): | 60 parts by mass |
| Epichlorohydrin rubber (product name: EPION 310, manufactured by Osaka Soda Co., Ltd.): | 40 parts by mass |
| Zinc stearate: | 1 part by mass |
| Zinc oxide: | 5 parts by mass |
| Calcium carbonate (product name: NANOX #30, manufactured by Maruo Calcium Co., Ltd.): | 20 parts by mass |
| Carbon black (product name: TOKABLACK #7400, manufactured by Tokai Carbon Co., Ltd.): | 40 parts by mass |

Next, the following materials were subjected to transverse crosscutting with open rolls each having a roll diameter of 12 inches (0.30 m) at a front roll revolution number of 10 rpm, a rear roll revolution number of 8 rpm, and a roll interval of 2 mm a total of 20 times. After that, the resultant was subjected to tight milling 10 times while the roll interval was set to 0.5 mm. Thus, a mixture 2 was obtained.

| | |
|---|---|
| Mixture 1: | 200 parts by mass |
| Sulfur: | 1.2 parts by mass |
| Tetrabenzylthiuram disulfide (product name: NOCCELER TBzTD, manufactured by Ouchi Shinko Chemical Industrial Co., Ltd.): | 4.5 parts by mass |

Production of NBR/Hydrin Elastic Layer

A primer (product name: METALOC U-20, manufactured by Toyokagaku Kenkyusho Co., Ltd.) was applied to a ground and aluminum-made cylindrical tube having an outer diameter of 13 mm and an arithmetic average roughness Ra of 0.2 μm, and was baked thereon to provide a substrate. The substrate was placed in a mold, and the mixture 2 was poured into a cavity formed in the mold. Subsequently, the mold was heated to heat the NBR/hydrin rubber at a temperature of 160° C. for 40 minutes, thereby curing the rubber. The substrate having the cured NBR/hydrin rubber layer formed on its peripheral surface was removed from the mold. Thus, an elastic roller K-1 in which the NBR/hydrin elastic layer having a thickness of 0.5 mm and a diameter of 14 mm was formed on the outer periphery of the substrate was produced.

Production of Elastic Roller K-2

Preparation of Diol for Producing Urethane Elastic Layer

The following materials were mixed, and were caused to react with each other at 175° C. for 12 hours. After that, the resultant was subjected to a reaction under a reduced pressure of 10 mmHg (1.3 kPa) at 210° C. for 12 hours to provide a condensation-polymerized diol for producing a urethane elastic layer 4.

| | |
|---|---|
| Raw material diol; 3-methyl-1,5-pentanediol (manufactured by Tokyo Chemical Industry Co., Ltd.): | 100 parts by mass |
| Dibasic acid; adipic acid (manufactured by Tokyo Chemical Industry Co., Ltd.): | 108.3 parts by mass |

Production of Urethane Elastic Layer

A primer (product name: HAMATITE No. 40, manufactured by The Yokohama Rubber Co., Ltd.) was applied to a ground and aluminum-made cylindrical tube having an outer diameter of 13 mm and an arithmetic average roughness Ra of 0.2 μm, and was baked thereon to provide a substrate. The substrate was placed in a mold, and a urethane rubber composition obtained by mixing the following materials was poured into a cavity formed in the mold.

| | |
|---|---|
| Isocyanate (product name: DURANATE TPA-100, manufactured by Asahi Kasei Corporation): | 7.37 parts by mass |
| Diol for producing a urethane elastic layer: | 100 parts by mass |
| Quaternary ammonium salt (product name: TETRABUTYLAMMONIUM BROMIDE, manufactured by Tokyo Chemical Industry Co., Ltd.): | 0.20 part by mass |

Subsequently, the mold was heated to heat the urethane rubber at a temperature of 120° C. for 75 minutes, thereby curing the rubber. The substrate having the cured urethane rubber layer formed on its peripheral surface was removed from the mold. Thus, an elastic roller K-2 in which the urethane rubber elastic layer having a thickness of 0.5 mm and a diameter of 14 mm was formed on the outer periphery of the substrate was produced.

Preparation of Raw Material for Forming Surface Layer

Synthesis of Isocyanate Group-Terminated Prepolymer

A synthesis example of an isocyanate group-terminated prepolymer that is a raw material for synthesizing the urethane resin of a surface layer is described. First, raw material polyols B-1 to B-3 to be used in the synthesis of the isocyanate group-terminated prepolymer were synthesized by the following methods.

Synthesis of Raw Material Polyol B-1

100.0 Grams (0.50 mol) of adipic acid (manufactured by Tokyo Chemical Industry Co., Ltd.) serving as a dicarboxylic acid, 87.0 g (1.14 mol) of 1,3-propanediol (manufactured by Tokyo Chemical Industry Co., Ltd.) serving as a diol, and 20.0 mg of a tetra-n-butyl orthotitanate tetramer (manufactured by Tokyo Chemical Industry Co., Ltd.) were loaded into a three-necked flask including a stirring machine and a temperature gauge, and were caused to react with each other under a nitrogen atmosphere at 160° C. for 4 hours.

Next, under the nitrogen atmosphere, the reaction liquid was cooled to 100° C., and a pressure in the flask was reduced to 150 mmHg (20.0 kPa) over 1 hour. Subsequently, the pressure was reduced from 150 mmHg to 40 mmHg (5.3 kPa) over 30 minutes. Thus, a polyester oligomer was obtained. Next, to copolymerize the polycarbonate, 76.7 g (0.65 mol) of diethyl carbonate (manufactured by Mitsui Fine Chemicals, Inc.) and 1.0 mg of zinc acetate dihydrate (manufactured by Nacalai Tesque, Inc.) were added thereto, and the mixture was subjected to a reaction under reduced pressure. After the reaction had been performed for 2 hours, the raw material polyol B-1 was obtained.

Synthesis of Raw Material Polyols B-2 and B-3

The raw material polyols B-2 and B-3 were each synthesized in the same manner as in the synthesis of the raw material polyol B-1 described above except that the raw materials to be used in the reactions and their mixing amounts were changed as shown in Table 1 below.

Preparation of Raw Material Isocyanate

Polymeric MDI (product name: MILLIONATE MR, manufactured by Tosoh Corporation) was prepared as a raw material isocyanate C-1 for preparing isocyanate group-terminated prepolymers to be described later by being caused to react with the above-mentioned raw material polyols.

Synthesis of Isocyanate Group-Terminated Prepolymer A-1

Under a nitrogen atmosphere, 30.8 parts by mass of the raw material isocyanate C-1 was dissolved in methyl ethyl ketone (hereinafter referred to as "MEK") in a reaction vessel so that the final solid content became 50%. After that, 100.0 parts by mass of the raw material polyol B-1 was gradually dropped into the solution while a temperature in the reaction vessel was held at 65° C.

After the completion of the dropping, the mixture was subjected to a reaction at a temperature of 65° C. for 2 hours. The resultant reaction mixture was cooled to room temperature to provide an isocyanate group-terminated prepolymer A-1 having a solid content of 50% and an isocyanate group content of 6.0 mass %.

Synthesis of Isocyanate Group-Terminated Prepolymers A-2 and A-3

Isocyanate group-terminated prepolymers A-2 and A-3 were each obtained as a solution having a solid content of 50% in the same manner as in the synthesis of the isocyanate group-terminated prepolymer A-1 except that the kinds and mixing amounts of the raw material polyol and the raw material isocyanate to be used in the synthesis, and the reaction time were changed as shown in Table 2. The column

TABLE 1

| Raw material polyol No. | Dicarboxylic acid | | Diol | | Diethyl carbonate | | Hydroxy value (mgKOH/g) |
|---|---|---|---|---|---|---|---|
| | Kind | Part(s) by mass | Kind | Part(s) by mass | Kind | Part(s) by mass | |
| B-1 | Adipic acid (manufactured by Tokyo Chemical Industry Co., Ltd.) | 100.0 | 1,3-Propanediol (manufactured by Tokyo Chemical Industry Co., Ltd.) | 110.0 | Diethyl carbonate (manufactured by Mitsui Fine Chemicals, Inc.) | 113.0 | 56.0 |
| B-2 | Adipic acid (manufactured by Tokyo Chemical Industry Co., Ltd.) | 100.0 | Diethylene glycol (manufactured by Tokyo Chemical Industry Co., Ltd.) | 175.0 | | 136.0 | 56.0 |
| B-3 | Sebacic acid (manufactured by Tokyo Chemical Industry Co., Ltd.) | 100.0 | 1,3-Propanediol (manufactured by Tokyo Chemical Industry Co., Ltd.) | 97.0 | | 91.6 | 56.0 |

"Isocyanate group concentration" shows a value when the solid content of an isocyanate group-terminated prepolymer is set to 100 mass %.

TABLE 2

| Isocyanate group-terminated prepolymer No. | Raw material polyol | | Raw material isocyanate | | Reaction time (hours) | Isocyanate group concentration (mass %) |
|---|---|---|---|---|---|---|
| | Kind | Part(s) by mass | Kind | Part(s) by mass | | |
| A-1 | B-1 | 100.0 | Polymeric MDI "MILLIONATE MR" (manufactured by Tosoh Corporation) | 30.2 | 3.0 | 12.0 |
| A-2 | B-2 | 100.0 | | 39.8 | 2.0 | 14.1 |
| A-3 | B-3 | 100.0 | | 19.8 | 2.0 | 9.8 |

Preparation of Polyol

Polyol compounds D-1 to D-3 shown in Table 3 below were prepared.

TABLE 3

| Polyol compound No. | Product name | Hydroxy value (mgKOH/g) |
|---|---|---|
| D-1 | TRIMETHYLOLETHANE (manufactured by Tokyo Chemical Industry Co., Ltd.) | 1,400 |
| D-2 | PENTAERYTHRITOL (manufactured by Tokyo Chemical Industry Co., Ltd.) | 1,648 |
| D-3 | KURARAY POLYOL P-2050 (manufactured by Kuraray Co., Ltd.) | 56 |

Measurement of SP Value of Binder Resin

Binder resins E-1 to E-4 were produced according to such formulation as shown in the following table, and their SP values were measured.

TABLE 4

| Binder resin | Isocyanate group-terminated prepolymer | | Polyol compound | | SP value |
|---|---|---|---|---|---|
| | No. | Part(s) by mass | No. | Part(s) by mass | |
| E-1 | A-1 | 95.4 | D-1 | 4.6 | 10.1 |
| E-2 | A-2 | 95.4 | D-2 | 4.6 | 11.0 |
| E-3 | A-1 | 96.9 | D-1 | 3.1 | 9.2 |
| E-4 | A-3 | 60.6 | D-3 | 39.4 | 8.3 |

Example 1

The following materials were stirred and mixed as surface layer materials.

| | |
|---|---|
| Isocyanate group-terminated compound: isocyanate group-terminated prepolymer A-1: | 95.4 parts by mass |
| Polyol compound: D-1: | 4.6 parts by mass |
| Carbon black (product name: MA-230, manufactured by Mitsubishi Chemical Corporation): | 25.0 parts by mass |
| Urethane resin fine particles (product name: ART PEARL C-400, manufactured by Negami Chemical Industrial Co., Ltd.): | 10.0 parts by mass |

Next, methyl ethyl ketone was added to the mixture so that the total solid content ratio became 30 mass %, followed by mixing with a sand mill. Next, the viscosity of the resultant was further adjusted to from 10 mPa·s to 13 mPa·s with MEK. Thus, a paint F-1 for forming a surface layer was prepared.

The paint F-1 was applied to a ground and aluminum-made conductive support of a cylindrical tube shape having an outer diameter of 14 mmφ and a center line average roughness Ra of 0.2 μm by a spray method to form a resin coating layer thereon. Subsequently, the resin coating layer was cured through heating in a hot air drying furnace at 150° C. for 30 minutes to form the surface layer (thickness: 10 μm) of the paint on the surface of the support. Thus, a developing roller No. H-1 according to Example 1 was produced.

The developing roller H-1 was subjected to the following evaluations.

Calculation of Content of Electroconductive Particles

The contents of electroconductive particles in the first region and second region of the surface layer were calculated as described below.

(i) The surface layer of the developing roller H-1 is cut with a razor in a direction perpendicular to the electroconductive support, and sectional samples of thin slices each having a thickness of 1.5 μm are produced from the layer with a microtome in an environment at a temperature of −120° C. established by using liquid nitrogen. The samples for observation were collected from a total of six sites formed of: three sites for dividing the surface layer in four equal parts in the longitudinal direction of the developing roller; and three sites obtained by rotating the sites by 180° each.

(ii) A secondary electron image was obtained for each of the sectional samples with a scanning electron microscope (e.g., a microscope available under the product name "Ultra-Plus" from Carl Zeiss AG) under the following conditions.

Observation conditions: a magnification of 20,000, an acceleration voltage of 1.0 kV (section), and a work D of 3.5 mm (iii) The resultant secondary electron image was binarized with image processing software (e.g., "Image J," open source) by Otsu's method, and the area ratio of the carbon black serving as the electroconductive particles in each of a rectangular region of the sectional sample measuring 150 nm in a depth direction from the first surface of the surface layer by 5,000 nm in a lateral direction, and a rectangular region thereof ranging from a depth of 150 nm from the first surface of the surface layer to a depth of 300 nm therefrom, and measuring 5,000 nm in the lateral direction was calculated with image processing software (product name: Luzex-AP, manufactured by Nireco Corporation).

The carbon black area ratios in the respective regions were calculated for each of the six sectional samples as described above, and the averages of the calculated values were adopted as the contents A1% and A2% of the electroconductive particles in the first region and the second region, respectively.

Method of Measuring Volume Resistivity

Three conductive tapes each having a width of 12 mm were wound around the surface of the developing roller H-1 at intervals of 8 mm, and a conductive tape D2 positioned at the center out of the three conductive tapes, and the mandrel of the developing roller H-1 were used as main electrodes in the measurement of the volume resistivity of the roller, while two conductive tapes D1 and D3 outside the tape D2 were used as guard electrodes therein. After the developing roller H-1 had been left to stand in an evaluation environment (having a temperature of 23° C. and a relative humidity of 50%) for 12 hours, the measurement was performed under the environment. The measurement was performed with an AC impedance analyzer (an impedance analyzer Model 1260 and a dielectric constant-measuring interface Model 1296 manufactured by Solartron Analytical). An AC voltage of 100 mV was superimposed on a DC voltage of 0 V, and the complex impedance characteristics of the roller were measured for a frequency change from 1 MHz to 1 Hz. A resistance component was calculated by analyzing the results of the measurement with impedance analysis software ZView. The volume resistivity was calculated from the component and the shape of the sample that had been separately determined.

Examples 2 to 13

Paints F-2 to F-9 for forming surface layers were each produced in the same manner as in Example 1 except that materials shown in each of Table 5 and Table 6 below were used as surface layer materials. Then, the respective paints were applied, dried, and heated in the same manner as in Example 1 to produce developing rollers H-2 to H-13 according to Examples 2 to 13. The developing rollers H-5 and H-6 according to Example 5 and Example 6 were produced by using the elastic rollers K-1 and K-2 produced in advance instead of the aluminum-made cylindrical tube of Example 1, respectively.

TABLE 5

| | Binder resin | | | | | Carbon black | | Urethane resin particles | |
| | Isocyanate group-terminated prepolymer | | Polyol compound | | | | | | |
| Paint | No. | Part(s) by mass | No. | Part(s) by mass | SP value | Product name | Part(s) by mass | Product name | Part(s) by mass |
|---|---|---|---|---|---|---|---|---|---|
| F-1 | A-1 | 95.4 | D-1 | 4.6 | 10.1 | MA-230 (manufactured by Mitsubishi Chemical Corporation) | 25.0 | ART PEARL C-400 (manufactured by Negami Chemical Industrial Co., Ltd.) | 10.0 |
| F-2 | A-1 | 95.4 | D-1 | 4.6 | 10.1 | | 5.0 | | |
| F-3 | A-1 | 95.4 | D-1 | 4.6 | 10.1 | | 10.0 | | |
| F-4 | A-1 | 95.4 | D-1 | 4.6 | 10.1 | | 40.0 | | |
| F-5 | A-2 | 95.4 | D-2 | 4.6 | 11.0 | | 25.0 | | |
| F-6 | A-1 | 96.9 | D-1 | 3.1 | 9.2 | | 25.0 | | |
| F-7 | A-3 | 60.6 | D-3 | 39.4 | 8.3 | | 30.0 | | |
| F-8 | A-1 | 95.4 | D-1 | 4.6 | 10.1 | #30 (manufactured by Mitsubishi Chemical Corporation) | 25.0 | | |

TABLE 6

| | Binder resin | | | Carbon black | | Urethane resin particles | |
| Paint | Kind | Part(s) by mass | SP value | Product name | Part(s) by mass | Product name | Part(s) by mass |
|---|---|---|---|---|---|---|---|
| F-9 | N-Methoxymethylated 6-nylon "TORESIN F-30K," manufactured by Nagase ChemteX Corporation | 100.0 | 10.5 | MA-230 (manufactured by Mitsubishi Chemical Corporation) | 25.0 | ART PEARL C-400 (manufactured by Negami Chemical Industrial Co., Ltd.) | 10.0 |

Comparative Example 1

4.6 Parts by mass of the polyol compound D-1, 95.4 parts by mass of the isocyanate group-terminated prepolymer A-1, 75.0 parts by mass of carbon black (product name: MA-230, manufactured by Mitsubishi Chemical Corporation), and 10.0 parts by mass of urethane resin fine particles (product name: ART PEARL C-400, manufactured by Negami Chemical Industrial Co., Ltd.) were stirred and mixed as surface layer materials.

After that, a paint G-1 for forming a surface layer according to Comparative Example 1 was prepared in the same manner as in the method of preparing the paint for forming a surface layer according to Example 1. The paint for forming a surface layer was applied to the surface of the aluminum-made conductive support of a cylindrical tube shape, and was dried to form a surface layer in the same manner as in Example 1. Thus, a developing roller J-1 of Comparative Example 1 was produced.

Comparative Examples 2 to 4

Paints G-2 to G-4 for forming surface layers were each produced in the same manner as in Comparative Example 1 except that materials shown in Table 7 below were used as surface layer materials. Then, each of the paints was applied to the aluminum-made conductive support of a cylindrical tube shape, dried, and heated in the same manner as in Comparative Example 1. Thus, developing rollers J-2 to J-4 according to Comparative Examples 2 to 4 were produced.

uct name: VKX-100, manufactured by Keyence Corporation) at a magnification of 200, and the degree of its toner contamination was evaluated based on the following criteria. The area ratio of a contaminated portion with respect to the entirety of an observed image was calculated, and the calculation was performed for N images where N represented 12, followed by the evaluation of the average of the calculated results.

A: The area ratio of the contaminated portion is less than 3%, that is, only slight contamination is observed.

B: The area ratio of the contaminated portion is 3% or more and less than 10%, that is, contamination is observed to some extent.

C: The area ratio of the contaminated portion is 10% or more, that is, remarkable contamination is observed.

Image Evaluation (Blotch)

Various images, such as a solid black image, a halftone image, and a line image, were formed, and an evaluation result was evaluated based on the following criteria with reference to visual observation of images, such as wavy unevenness and a blotch (spot-like unevenness), on the formed images, and a toner coating failure on a developing sleeve at the time of the performance of the image formation.

TABLE 7

| | Binder resin | | | | Carbon black | | Urethane resin particles | |
|---|---|---|---|---|---|---|---|---|
| | Isocyanate group-terminated prepolymer | | Polyol compound | | | | | |
| Paint No. | No. | Part(s) by mass | No. | Part(s) by mass | SP value | Product name | Part(s) by mass | Product name | Part(s) by mass |
| G-1 | A-1 | 95.4 | D-1 | 4.6 | 10.1 | MA-230 (manufactured by Mitsubishi Chemical Corporation) | 75.0 | ART PEARL C-400 (manufactured by Negami Chemical Industrial Co., Ltd.) | 10.0 |
| G-2 | A-1 | 95.4 | D-1 | 4.6 | 10.1 | | 0.0 | | |
| G-3 | A-3 | 60.6 | D-3 | 39.4 | 8.3 | | 75.0 | | |
| G-4 | A-3 | 60.6 | D-3 | 39.4 | 8.3 | | 15.0 | | |

Evaluation

Each of the developing rollers of Examples and Comparative Examples was evaluated by performing an endurance test for each of the following evaluation items as described below. The developing roller of a cartridge 37Y for a laser printer (manufactured by Hewlett-Packard Company) was replaced with the developing roller H-1 according to Example 1. Next, a laser printer (product name: HP LaserJet Enterprise M609dn, manufactured by Hewlett-Packard Company) was loaded with the cartridge. The roller was subjected to endurance evaluations for a blotch image and the abrasion resistance of the surface layer in a low-temperature and low-humidity (L/L) environment having a temperature of 15° C. and a humidity of 10%. The developing rollers H-2 to H-13 and the developing rollers J-1 to J-4 were similarly evaluated. The physical properties of the surface layers of the resultant developer carrying members, and the evaluation results of the developer carrying members are shown in Table 8 and Table 9. The developer carrying members of Examples provided satisfactory results in terms of both of image and durability.

Evaluation of Contamination Resistance of Surface Layer

The surface of the developer carrying member after the endurance test was observed with a laser microscope (prod- A: None of the wavy unevenness, the blotch, and the toner coating failure can be observed on the images and the sleeve.

B: The toner coating failure can be slightly observed on the sleeve, but substantially none of the wavy unevenness and the blotch can be observed on the images.

C: The wavy unevenness and the blotch can be observed on the halftone image or the solid black image.

D: The wavy unevenness and the blotch can be observed on the entirety of the solid black image.

Evaluation of Abrasion Resistance of Surface Layer

The shaved amount of the thickness of the surface layer of the developer carrying member after the endurance test as compared to the thickness before the test was measured as follows: fixed points on the layer that had been observed in advance before the endurance were observed after the endurance again, and their surface shapes before and after the endurance were observed. In the measurement, the observation was performed with a laser microscope (product name: VKX-100, manufactured by Keyence Corporation) at a magnification of 50. N points where N represented 3 were used as the fixed points, and the shaved amount was calculated by averaging their respective deformation amounts.

The evaluation results of the developing rollers H-1 to H-13 and J-1 to J-4 are shown in Table 8 and Table 9.

TABLE 8

| Example No. | Developing roller No. | Elastic layer Presence or absence | Kind | Thickness (μm) | Surface layer Paint | A1 (%) | A2 (%) | Rv (Ω·cm) | Thickness (μm) | Evaluation Contamination resistance evaluation rank | Image (blotch) evaluation rank | Shaved amount (μm) |
|---|---|---|---|---|---|---|---|---|---|---|---|---|
| 1 | H-1 | Absent | — | — | F-1 | 17.2 | 21.5 | 3.8E+00 | 10 | A | A | 1.5 |
| 2 | H-2 | Absent | — | — | F-2 | 1.0 | 1.8 | 9.8E+01 | 10 | A | B | 1.7 |
| 3 | H-3 | Absent | — | — | F-3 | 10.1 | 13.2 | 5.7E+01 | 10 | A | B | 1.6 |
| 4 | H-4 | Absent | — | — | F-4 | 24.8 | 32.3 | 5.6E−01 | 10 | B | A | 1.8 |
| 5 | H-5 | Present | K-1 | 500 | F-1 | 20.1 | 21.4 | 4.6E+00 | 10 | B | B | 1.7 |
| 6 | H-6 | Present | K-2 | 500 | F-1 | 21.3 | 21.6 | 5.4E+00 | 10 | B | B | 1.7 |
| 7 | H-7 | Absent | — | — | F-5 | 16.0 | 21.4 | 3.2E+00 | 10 | A | A | 1.6 |
| 8 | H-8 | Absent | — | — | F-6 | 18.0 | 21.4 | 4.2E+00 | 10 | A | A | 1.7 |
| 9 | H-9 | Absent | — | — | F-8 | 23.3 | 24.2 | 1.2E+00 | 10 | B | A | 2.4 |
| 10 | H-10 | Absent | — | — | F-1 | 17.2 | 21.5 | 3.8E+00 | 3 | A | A | 2.5 |
| 11 | H-11 | Absent | — | — | F-1 | 17.2 | 21.5 | 3.8E+00 | 53 | A | A | 2.7 |
| 12 | H-12 | Absent | — | — | F-9 | 17.6 | 21.6 | 3.9E+00 | 10 | A | A | 2.8 |
| 13 | H-13 | Absent | — | — | F-7 | 24.9 | 26.4 | 5.0E+01 | 10 | B | B | 2.2 |

TABLE 9

| Comparative Example No. | Developing roller No. | Elastic layer Presence or absence | Kind | Thickness (μm) | Surface layer Paint | A1 (%) | A2 (%) | Rv (Ω·cm) | Thickness (μm) | Evaluation Contamination resistance evaluation rank | Image (blotch) evaluation rank | Shaved amount |
|---|---|---|---|---|---|---|---|---|---|---|---|---|
| 1 | J-1 | Absent | — | — | G-1 | 40.1 | 40.0 | 1.2E−01 | 10 | C | A | 2.0 |
| 2 | J-2 | Absent | — | — | G-2 | 0.0 | 0.0 | >1.0E+06 | 10 | B | D | 1.8 |
| 3 | J-3 | Absent | — | — | G-3 | 40.2 | 40.2 | 4.8E−01 | 10 | C | B | 2.0 |
| 4 | J-4 | Absent | — | — | G-4 | 20.1 | 19.8 | 2.5E+04 | 10 | A | C | 1.8 |

According to one aspect of the present disclosure, there can be obtained the developer carrying member that can stably provide a high-quality electrophotographic image. According to another aspect of the present disclosure, there can be obtained the process cartridge conducive to the formation of a high-quality electrophotographic image. According to another aspect of the present disclosure, there can be obtained the electrophotographic image forming apparatus that can stably form a high-quality electrophotographic image.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

What is claimed is:

1. A developer carrying member comprising: an electroconductive support; and
a surface layer in the stated order,
wherein the surface layer contains a binder resin and electroconductive particles, and a content of the electroconductive particles in a region from a first surface of the surface layer opposite to a second surface thereof on a side facing the electroconductive support to a depth of 150 nm is 1% or more and 25% or less, and
wherein the surface layer has a volume resistivity of $1.0 \times 10^{-2}$ Ω·cm or more and $1.0 \times 10^{2}$ Ω·cm or less.

2. The developer carrying member according to claim 1, wherein the surface layer is directly provided on the electroconductive support.

3. The developer carrying member according to claim 1, wherein the binder resin contains a urethane resin.

4. The developer carrying member according to claim 3, wherein the surface layer contains a cured product of a paint for forming the surface layer, the paint containing a polyisocyanate, a polyol, and the electroconductive particles.

5. The developer carrying member according to claim 4, wherein a mixture containing the polyisocyanate and the polyol in the same content ratio as that in the paint has a SP value of 9.0 or more.

6. The developer carrying member according to claim 1, wherein the electroconductive support has an outer surface containing at least one of aluminum or alumina.

7. The developer carrying member according to claim 1, wherein the electroconductive particles are carbon black having a pH of 7.0 or less.

8. A process cartridge removably mounted onto a main body of an electrophotographic apparatus, the process cartridge comprising at least:
a toner container containing toner; and
a developer carrying member configured to convey the toner,
wherein the developer carrying comprises member comprises an electroconductive support and a surface layer in the stated order,
the surface layer contains a binder resin and electroconductive particles,
a content of the electroconductive particles in a region from a first surface of the surface layer opposite to a second surface thereof on a side facing the electroconductive support to a depth of 150 nm is 1% or more and 25% or less, and wherein the surface layer has a volume resistivity of $1.0 \times 10^{-2}$ Ω·cm or more and $1.0 \times 10^{2}$ Ω·cm or less.

9. An electrophotographic image forming apparatus comprising at least:

an electrophotographic photosensitive member;

a charging member arranged so as to be capable of charging the electrophotographic photosensitive member; and a developer carrying member configured to supply toner to the electrophotographic photosensitive member, wherein the developer carrying member comprises an electroconductive support and a surface layer in the stated order, the surface layer contains a binder resin and electroconductive particles, a content of the electroconductive particles in a region from a first surface of the surface layer opposite to a second surface thereof on a side facing the electroconductive support to a depth of 150 nm is 1% or more and 25% or less, and wherein the surface layer has a volume resistivity of $1.0 \times 10^{-2}$ Ω·cm or more and $1.0 \times 10^{2}$ Ω·cm or less.

\* \* \* \* \*